(12) United States Patent
Eckert et al.

(10) Patent No.: US 8,140,236 B2
(45) Date of Patent: Mar. 20, 2012

(54) METHOD FOR REGULATING THE BRAKE PRESSURE IN MOTORCYCLES

(75) Inventors: Alfred Eckert, Mainz-Hechtsheim (DE); Peter Olejnik, Rosbach (DE); Ralf Reviol, Dietzenbach-Steinberg (DE)

(73) Assignee: Continental Teves AG & Co. oHG (DE)

( * ) Notice: Subject to any disclaimer, the term of this patent is extended or adjusted under 35 U.S.C. 154(b) by 670 days.

(21) Appl. No.: 12/299,373

(22) PCT Filed: Apr. 20, 2007

(86) PCT No.: PCT/EP2007/053891
§ 371 (c)(1),
(2), (4) Date: Jan. 8, 2009

(87) PCT Pub. No.: WO2007/128670
PCT Pub. Date: Nov. 15, 2007

(65) Prior Publication Data
US 2009/0118961 A1 May 7, 2009

(30) Foreign Application Priority Data

May 6, 2006 (DE) .......................... 10 2006 021 140
Apr. 20, 2007 (DE) .......................... 10 2007 019 039

(51) Int. Cl.
*B60T 7/00* (2006.01)
(52) U.S. Cl. ........................................ 701/78; 303/155
(58) Field of Classification Search ................ 701/48, 701/70–83; 303/8, 9.71, 121, 122, 124, 125, 303/155, 166, 167, 191; 188/2 A, 2 F, 4 B, 188/18 A, 65.3, 71–73, 79, 82.1, 84, 271–272, 188/140 A, 349, 206 R, 215, 217, 218 R; 477/4, 21–29, 40, 71, 92, 170, 172, 182–184, 477/188, 189, 194, 196, 198, 199, 201–211; 475/43; 280/11
See application file for complete search history.

(56) References Cited

U.S. PATENT DOCUMENTS

| 5,560,690 | A | * | 10/1996 | Hattori et al. ............. 303/116.2 |
| 5,611,606 | A | * | 3/1997 | Nell et al. .................... 303/155 |
| 5,722,744 | A | * | 3/1998 | Kupfer et al. ................ 303/189 |
| 5,938,297 | A | * | 8/1999 | Whaite et al. ............. 303/114.3 |
| 6,409,285 | B1 | | 6/2002 | Wakabayashi et al. |

(Continued)

FOREIGN PATENT DOCUMENTS

| DE | 100 11 375 A1 | 9/2000 |
| DE | 102 37 102 A1 | 2/2004 |
| DE | 10 2005 041 281 A1 | 3/2006 |

(Continued)

*Primary Examiner* — Mary Cheung
(74) *Attorney, Agent, or Firm* — RatnerPrestia

(57) ABSTRACT

A brake system for motorcycles and a method for regulating the brake pressure in a motorcycle having an anti-lock function and having an integral brake function are provided. By means of the integral brake function, front wheel brake means are actuated in connection with brake actuation at a rear wheel (RW), and a brake pressure ($p^{soll}_{vr}$) in front wheel brake circuit is regulated on the basis of a predefined dependency (f) of a pressure ($p^{mess}_{HZ\,RW}$) caused by the brake actuation at the master brake cylinder of a rear wheel brake circuit. In the event of an anti-lock function at the rear wheel (RW), a higher brake pressure ($p^{soll}_{vr}$) is set in the front wheel brake circuit than is set at the present pressure ($p^{mess}_{HZ\,RW}$) at the master brake cylinder on the basis of the dependency (f) in the absence of anti-lock regulating intervention.

9 Claims, 4 Drawing Sheets

U.S. PATENT DOCUMENTS

| | | |
|---|---|---|
| 7,219,965 B2 | 5/2007 | Wagner |
| 2004/0046444 A1 | 3/2004 | Huebner et al. |
| 2005/0001477 A1* | 1/2005 | Mederer et al. ............ 303/113.5 |
| 2007/0029875 A1* | 2/2007 | Kurosaki et al. .............. 303/187 |
| 2007/0040446 A1* | 2/2007 | Hamm .......................... 303/137 |

FOREIGN PATENT DOCUMENTS

| | | |
|---|---|---|
| EP | 0 387 783 A2 | 9/1990 |
| EP | 1 318 933 B1 | 5/2004 |
| EP | 1 674 362 A1 | 6/2006 |
| EP | 1 702 822 A | 9/2006 |

* cited by examiner

METHOD FOR REGULATING THE BRAKE PRESSURE IN MOTORCYCLES

CROSS REFERENCE TO RELATED APPLICATIONS

This application is the U.S. national phase application of PCT International Application No. PCT/EP2007/053891, filed Apr. 20, 2007, which claims priority to German Patent Application No. DE102006021140.5, filed May 6, 2006 and German Patent Application No. DE102007019039.7, filed Apr. 20, 2007, the contents of such applications being incorporated by reference herein in their entirety.

BACKGROUND OF THE INVENTION

1. Field of the Invention

The invention relates to a brake system for motorcycles and a method for regulating the brake pressure in a motorcycle having an antilock function and having an integral brake function.

2. Description of the Related Art

In the course of the last few decades, motorcycles have developed from a cost-effective means of locomotion into a leisure vehicle in which the emphasis is placed increasingly on both safety and the comfort of the driver.

Similarly to automobiles a few years ago, motorcycles are also increasingly being equipped with antilock systems (ABS). EP 0 548 985 B1 discloses, for example, an antilock device for motorcycles. In addition, DE 40 00 212 A1 discloses a method for braking a motorcycle with antilock protection and for determining the coefficient of adhesion.

Motorcycles traditionally have an activation element for each of the two brake circuits. The front wheel brakes are usually activated by what is referred to as a manual brake lever and the rear wheel brake by what is referred to as a footbrake lever.

In the context of motorcycles, integral brake system is understood to be a brake system in which, when the manual brake lever or the footbrake lever is activated, the brake of the second brake circuit is additionally braked. By activating a single activation element, both brakes can therefore be actuated. If both brakes are respectively actuated when the manual brake lever and the footbrake lever are activated, this is referred to as a fully integral brake system. However, combinations are also possible in which one brake lever acts on one wheel, and the other brake lever acts on both wheels (partially integral brake system). Integral brake systems for motorcycles are known, for example, from DE 38 03 563 A1 and DE 103 16 351 A1.

In motorcycles with an integral function, owing to the activation of a single activation element (for example manual brake lever and/or footbrake lever), the automatic braking force distribution or the braking pressure distribution between the front wheel and rear wheel takes place either by means of fixed hydraulic circuitry (referred to as a combined brake system (CBS)) by means of which the braking force distribution is predefined in an invariable fashion with a predefined ratio, or by means of an electronic system by means of which the predefined braking force distribution is controlled. In electronic systems with an integral brake function and antilock function, the braking force distribution between the front and rear wheels can be adapted, in the case of ABS braking, to the actual load (Bremsenhandbuch [Brake manual], 2nd edition, July 2004, Vieweg Verlag, ISBN 3-528-13952-8, pages 184-192).

DE 10 2005 003 255 A1 discloses a brake system for motorcycles which ensures the functionality of ABS and integral braking with a structurally simple design.

SUMMARY OF THE INVENTION

The invention relates to an improved brake system with an integral brake function and antilock function for motorcycles and an improved method for regulating the brake pressure in a motorcycle having an antilock function and having an integral brake function.

The invention also relates to a motorcycle brake system having an antilock function and having an electronic integral brake function in which, when the rear wheel brake lever is activated, the front wheel brake pressure is regulated on the basis of a first predefined dependency on the pressure of the rear wheel master brake cylinder.

The invention further relates to the idea that, in the case of an antilock regulating intervention at the rear wheel of the motorcycle, a front wheel brake pressure is applied by the integral function which is higher than the front wheel brake pressure which would be applied at the prevailing pressure at the rear wheel master brake cylinder when an antilock regulating intervention by the integral function on the basis of the first dependency does not occur.

The front wheel brake pressure which is applied in the case of an antilock regulating integration at the rear wheel is determined on the basis of a second predefined dependency from the pressure brought about at the rear wheel master brake cylinder by the activation of the brake. Predefining a second dependency ensures rapid and easy determination of the front wheel brake pressure which is to be applied. This second dependency is particularly preferably stored in a control unit. It is quite particularly preferably stored in the electronic control unit of the brake system.

According to one alternative preferred embodiment of the method, front wheel brake pressure which is applied by the integral function in the case of an antilock regulating intervention at the rear wheel is controlled on the basis of the achieved braking effect of the motorcycle. This provides the advantage of flexible regulation of the front wheel brake pressure in accordance with the actual profile of the braking process. For this purpose, the instantaneous braking torque of the motorcycle is particularly preferably compared with a predefined setpoint braking torque, and the front wheel brake pressure is regulated in such a way that the instantaneous braking torque and setpoint braking torque approximately correspond. The instantaneous braking torque is quite particularly preferably determined from the average rear wheel brake pressure. This is advantageously done on the basis of a predefined characteristic curve. The setpoint braking torque corresponds quite particularly preferably to the braking torque which would result when braking is carried out with the same pressure at the rear wheel master brake cylinder without antilock regulation.

It is also preferred that the front wheel brake pressure which is applied when there is an antilock regulating intervention at the rear wheel is selected as a function of the velocity of the vehicle. By taking into account the velocity of the vehicle, it becomes possible to assess the travel situation and therefore a selection or regulation of the front wheel brake pressure which is adapted to the travel situation is not carried out.

The front wheel brake pressure which is applied when an antilock regulating intervention occurs at the rear wheel is preferably selected to be so much higher that the braking effect on the motorcycle which is achieved in the case of an antilock regulating intervention is approximately the same as the braking effect which is achieved in the case of no antilock regulating intervention. This is referred to as compensation. The compensation is particularly preferably carried out for any predefined master brake cylinder pressure of the rear wheel brake circuit. Through such a selection of the front wheel brake pressure, in the case of antilock regulation at the rear wheel approximately the same braking effect and therefore the same braking distance is achieved as when no antilock regulation occurs when braking is carried out with the same activation of the brake. The loss of braking effect through the antilock brake pressure regulation at the rear wheel is therefore compensated by the increased brake pressure at the front wheel.

According to another preferred embodiment of the method, the front wheel brake pressure which is applied when there is an antilock regulating intervention at the rear wheel is selected to be higher to such an extent that the braking effect on the motorcycle which is achieved in the case of an antilock regulating intervention is greater than the braking effect which is achieved in the case of no antilock regulating intervention. This is referred to as overcompensation. The front wheel brake pressure is particularly preferably selected such that the braking effect which is achieved is higher by a predefined amount than the braking effect which is achieved in the case of no antilock regulating intervention. Furthermore, it is particularly preferred that the overcompensation is achieved for any predefined pressure at the rear wheel master brake cylinder. Through such a selection of the front wheel brake pressure, in the case of antilock regulation at the rear wheel a type of brake assistance function is realized, since a greater braking effect is achieved by virtue of the overcompensation compared to braking without an antilock regulating intervention.

The described brake assistance function is particularly advantageous in the case of emergency braking, in order to assist the driver in carrying out the braking and to achieve a braking distance which is as short as possible. For this reason, according to one preferred embodiment of the method according to aspects of the invention, the front wheel brake pressure is then selected in such a way that the braking effect which is achieved in the case of an antilock regulating intervention is greater than the braking effect which is achieved in the case of no antilock regulating intervention when emergency braking has been detected.

The front wheel brake pressure is also preferably then selected in such a way that the braking effect on the motorcycle which is achieved in the case of an antilock regulating intervention is greater than the braking effect which is achieved in the case of no antilock regulating intervention when the rear wheel brake pressure at the start of the antilock regulation is higher than a predefined limiting value. A high rear wheel brake pressure indicates a relatively high coefficient of friction and therefore indicates the possibility, in the case of overcompensation, of achieving a relatively large braking effect, and therefore a relatively short braking distance. When there are low rear wheel brake pressures, overcompensation is not necessarily required. For this reason, it is then preferred to carry out the above-described compensation in which the rear wheel brake pressure is selected such that the braking effect on the motorcycle which is achieved in the case of an antilock regulating intervention is approximately the same as the braking effect which is achieved in the case of no antilock regulating intervention.

Alternatively or additionally, the front wheel brake pressure is preferably then selected in such a way that the braking effect which is achieved in the case of an antilock regulating intervention is greater than the braking effect which is achieved in the case of no antilock regulating intervention when the coefficient of friction of the underlying surface is higher than a predefined limiting value. A high coefficient of friction means, in the case of overcompensation, achieving a greater braking effect and therefore a shorter braking distance. At low coefficients of friction, overcompensation is disadvantageous since an unstable driving state is brought about by the overcompensation without the braking effect being appreciably increased. Therefore, when there is a coefficient of friction which is lower than a predefined limiting value, the above-described compensation is preferred, in which compensation the front wheel brake pressure is selected in such a way that the braking effect on the motorcycle which is achieved in the case of an antilock regulating intervention is approximately the same as the braking effect which is achieved in the case of no antilock regulating intervention.

Alternatively or additionally, the front wheel brake pressure is preferably then selected in such a way that the braking effect which is achieved in the case of an antilock regulating intervention is greater than the braking effect which is achieved in the case of no antilock regulating intervention when the velocity of the vehicle is higher than a predefined limiting value. Braking operations at high velocities are generally to be considered as critical, and overcompensation is therefore advantageous in order to brake the motorcycle as quickly as possible. At low velocities, overcompensation is not carried out, since it may then be a case of a slow journey around tight bends or a maneuvering operation in which overcompensation by the driver is felt to be disruptive. For this reason, at velocities which are lower than a predefined limiting value the above described compensation, in which the front wheel brake pressure is selected in such a way that the braking effect on the motorcycle which is achieved in the case of an antilock regulating intervention is approximately the same as the braking effect which is achieved in the case of no antilock regulating intervention, is preferred.

The invention also relates to a brake system for motorcycles having an antilock system and having an integral brake function and in which a method according to aspects of the invention is carried out.

An advantage of the invention is that a braking distance which is as short as possible is ensured even in the case of antilock regulation and/or severe braking (braking in the event of a hazard).

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
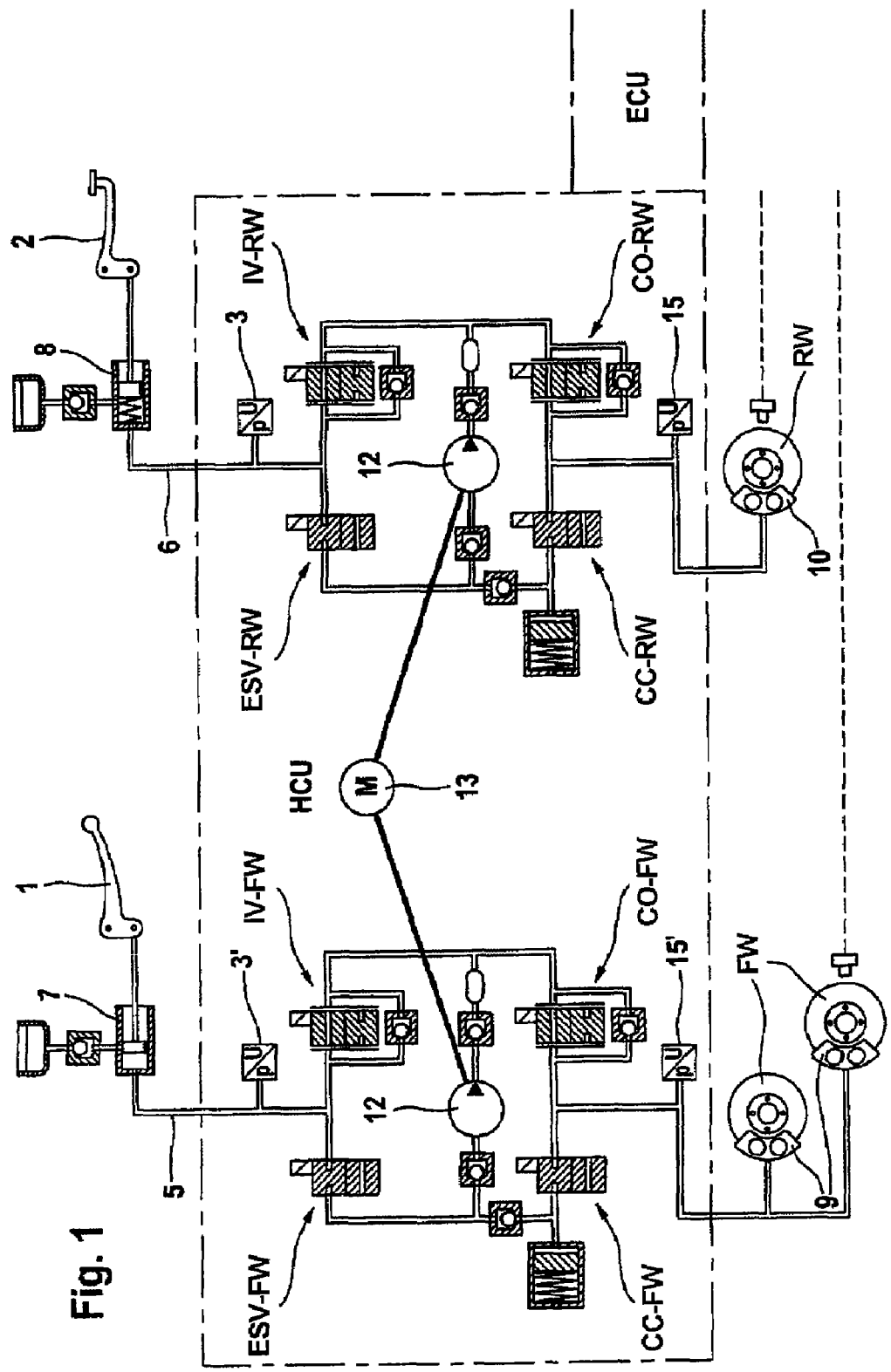
FIG. 1 shows an exemplary integral brake system of a motorcycle for carrying out a method according to aspects of the invention.

FIG. 1 shows an exemplary integral brake system for a motorcycle. Said integral brake system is composed of two brake circuits 5, 6, one for the front wheel FW and one for the rear wheel RW, each with a master brake cylinder 7, 8. The driver uses a manual brake lever 1 to directly activate the front wheel brake or brakes 9, and uses a foot pedal 2 to activate the rear wheel brake 10. The brake system contains four brake sensors 3, 3', 15, 15', two for each front wheel brake circuit 5 and each rear wheel brake circuit 6. In each case one pressure sensor 3' 3 measures the pressure $p^{meas}_{MC\,FW}$, $p^{meas}_{MC\,RW}$ which is respectively generated by the associated master brake cylinder 7, 8 (front wheel FW or rear wheel RW), and in each case one pressure sensor 15', 15 measures the wheel brake pressure $p_{FW}$, $p_{RW}$ (front wheel FW or rear wheel RW).

By activating the foot pedal 2, a brake pressure $p_{RW}$ is built up at the rear wheel RW, since the isolating valve IV-RW and the CO-RW valve (CO=currentless in open state) are not energized and there is therefore a hydraulic through-connection. Owing to the electronic integral function, by detection of the pressure $p^{meas}_{MC\,RW}$ at the master brake cylinder 8 of the rear wheel brake circuit 6, for example by the pressure sensor 3 by means of the pump 12 which is of dual-circuit design, a brake pressure $p_{FW}$ is simultaneously built up at the front wheel FW, since there the valve ESV (electrical switching valve) and the CO-FW valve are opened and the IV-FW valve are closed. The pump 12 which is of dual-circuit design operates according to the feedback principle and the pump pistons of the two pump circuits are driven jointly by an electric motor 13.

The term combined brake system (CBS) (not illustrated) is meant to refer to a purely mechanical/hydraulic variant of the integral brake. Here, there is a connection from the foot pedal 2 (footbrake lever), which only has a hydraulic connection to the rear wheel RW in brake systems without an integral function or in the brake system in FIG. 1, and also a hydraulic connection to the front wheel FW. These hydraulics operate separate brake pistons at the front wheel FW, which are generally fewer and/or smaller overall. The same applies to the manual brake lever 1.

A build up in brake pressure at the front wheel FW when the foot pedal 2 is activated (referred to as rear to front function) which is known from CBS systems is implemented, for example, in the integral brake system in FIG. 1 by wire by actively generating brake pressure at the front wheel FW without an additional piston of the front wheel brake 9, in that an electronic control unit ECU actuates a pump 12 which carries out the active build up in pressure. For this purpose, a basic characteristic curve is predefined, which curve is stored, for example, in the electronic control unit ECU and describes a functional relationship f between the pressure, which is brought about at the master brake cylinder $p^{meas}_{MC\,RW}$ as a result of the activation of the footbrake lever 2, and the setpoint brake pressure $p^{setp}_{FW}$ which is to be applied to the front wheel FW:

$$p^{setp}_{FW} = f(p^{meas}_{MC\,RW}) \tag{1}$$

Figure 2:
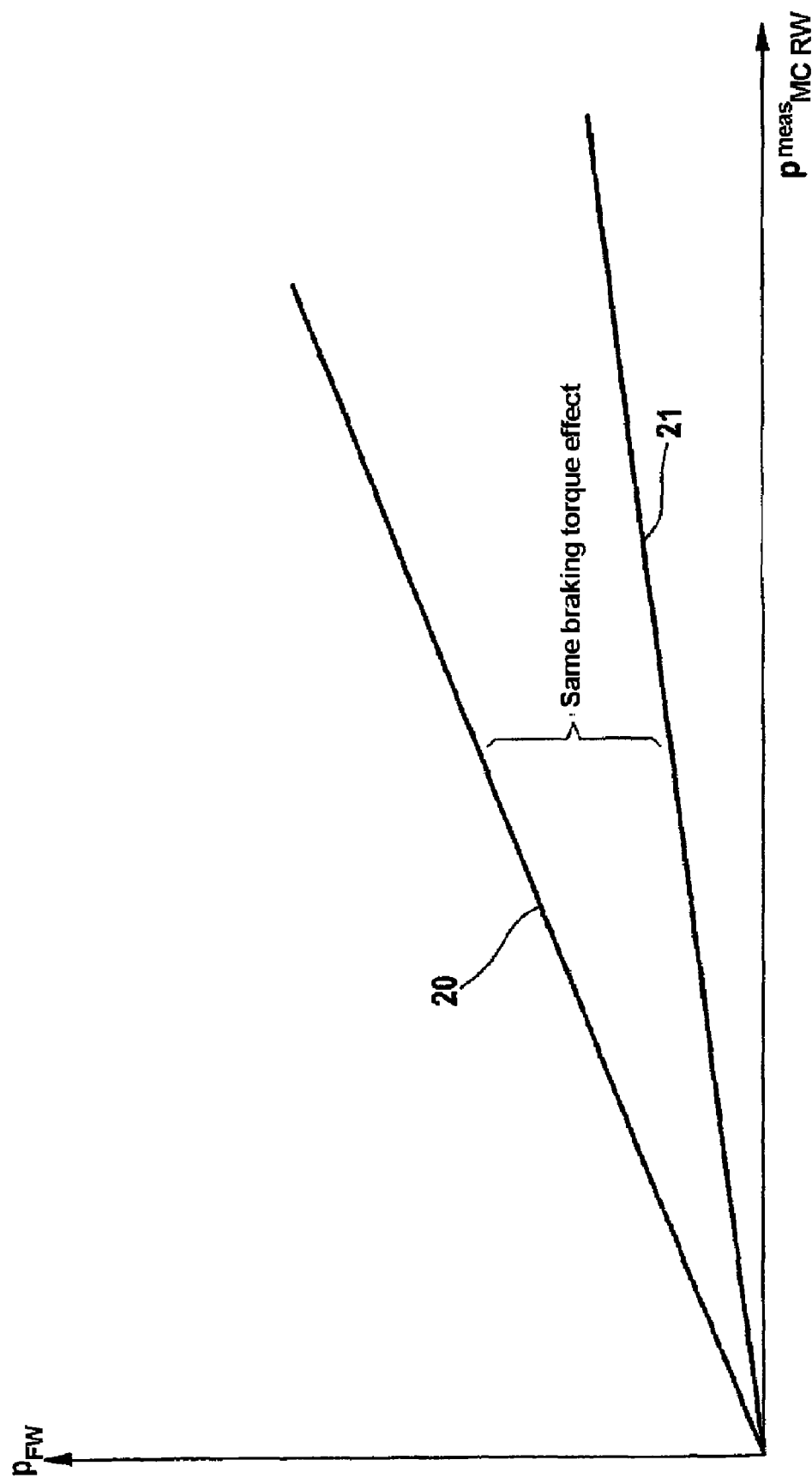
FIG. 2 shows a comparison of a relationship between pressure at the footbrake cylinder and brake pressure at the front wheel for a CBS brake system and the exemplary brake system from FIG. 1.

FIG. 2 shows a comparison of a relationship between pressure at the footbrake cylinder $p^{meas}_{MC\,RW}$ and the brake pressure at the front wheel $p_{FW}$ for a CBS brake system and an exemplary brake system in a schematic illustration. By way of example, line 20 represents the relationship for a CBS system, and line 21 represents the relationship for an electronic fully integral brake system, for example the one illustrated in FIG. 1. In order to achieve the same braking torque, the brake system in FIG. 1 requires a significantly lower brake pressure $p_{FW}$ compared to the CBS system, since, owing to the presence of a hydraulic line in the brake system in FIG. 1, all the brake pistons at the front wheel FW are activated, while in a CBS system fewer and/or smaller brake pistons are used at the front wheel FW.

Figure 3:
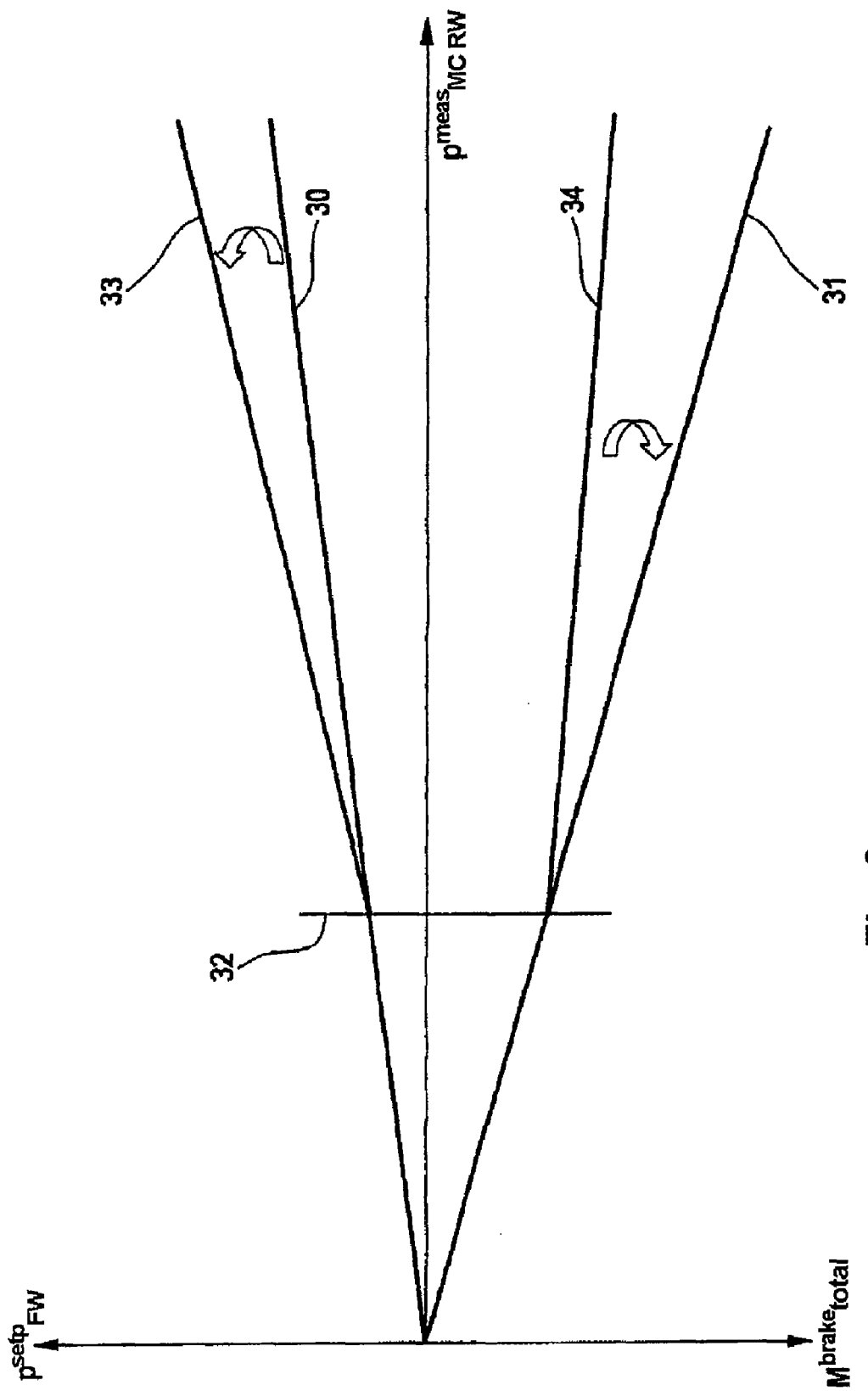
FIG. 3 shows a first exemplary change in the relationship between the pressure at the footbrake cylinder and the brake pressure at the front wheel after deployment of antilock regulation at the rear wheel (compensation)

In the upper part in FIG. 3, the setpoint brake pressure $p^{setp}_{FW}$ which is to be applied at the front wheel FW is plotted against the pressure which is brought about at the master brake cylinder $p^{meas}_{MC\,RW}$ by the activation of the footbrake lever 2. The line 30 shows an exemplary basic characteristic curve according to equation (1). The line 30 corresponds to the basic characteristic curve 21 from FIG. 2. In the lower part of FIG. 3, the corresponding braking torque $M_{brake\,total}$ (total braking torque of the motorcycle) is plotted with line 31 as a function of the rear master brake cylinder pressure $p^{meas}_{MC\,RW}$. The two lines 30 and 31 correspond to the relationships as long as no antilock regulation occurs at the rear wheel RW. The basic characteristic curve 30 is, for example, a linear characteristic curve, i.e. a linear relationship between the rear master brake cylinder pressure $p^{meas}_{MC\,RW}$ and the front wheel brake pressure $p^{setp}_{FW}$.

When the footbrake lever 2 is activated and antilock regulation subsequently occurs at the rear wheel RW at point 32, the average braking torque or the braking effect of the motorcycle is reduced as a result of the antilock pressure modulation/pressure limitation at the rear wheel RW. The line 34 in the lower part of FIG. 3 represents the braking torque $M_{brake\,total}$ (total braking torque of the motorcycle) which occurs using the basic characteristic curve 30 when antilock regulation occurs at the rear wheel RW. Here, owing to the pressure modulation at the rear wheel RW, the braking torque $M_{brake\,total}$ (line 34) which is achieved with a front wheel brake pressure $p^{setp}_{FW}$ applied in accordance with the basic characteristic curve 30 is lower than the braking torque $M_{brake\,total}$ (line 31) which is achieved without antilock regulation at the rear wheel RW with a front wheel brake pressure $p^{setp}_{FW}$ applied in accordance with the basic characteristic curve 30.

In the case of antilock regulation, according to aspects of the invention the rear to front pressure transmission characteristic curve is changed, i.e. the functional relationship between the master brake cylinder pressure $p^{meas}_{MC\,RW}$ which is brought about as a result of the activation of the footbrake lever and the brake pressure $p^{setp}_{FW}$ which is to be applied at the front wheel is changed. For example, a corresponding characteristic curve is predefined which is stored, for example, in the electronic control unit ECU and which describes the changed functional relationship $f_{ABS}$ between the rear master brake cylinder pressure $p^{meas}_{MC\,RW}$ and the front setpoint brake pressure $p^{setp}_{FW}$:

$$p^{setp}_{FW} = f_{ABS}(p^{meas}_{MC\,RW}) \tag{2}$$

According to aspects of the invention, when antilock regulation occurs (from point 32) at the rear wheel RW for a predefined rear master brake cylinder pressure $p^{meas}_{MC\,RW}$ a front wheel brake pressure $p^{setp}_{FW}$ which is relatively high compared to the basic characteristic curve 30 is applied.

In the upper part in FIG. 3, an exemplary characteristic curve 33 is plotted which describes a relationship $f^{compensation}_{ABS}$, changed compared to equation (1), between the setpoint brake pressure $p^{setp}_{FW}$ at the front wheel FW and the master cylinder pressure $p^{meas}_{MC\ RW}$ of the rear wheel brake circuit 6. For example, the front wheel brake pressure $p^{setp}_{FW}$ according to characteristic curve 33 is increased to such an extent compared to the basic characteristic curve 30 that, using the characteristic curve 33 when antilock regulation occurs, in sum (front and rear) approximately the same braking torque $M_{brake\ total}$ occurs as that which had occurred without antilock regulation at the rear wheel RW given the same setting/activation of the footbrake lever (line 31). Characteristic curve 33 is, for example, a linear characteristic curve, i.e. a linear relationship $f^{compensation}_{ABS}$ between the rear master brake cylinder pressure $p^{meas}_{MC\ RW}$ and the front wheel brake pressure $p^{setp}_{FW}$.

It is also possible to state that the rear wheel brake component which is absent owing to the antilock regulation is compensated by an increase in the transmission of braking to the front wheel FW.

According to another exemplary embodiment, the setpoint brake pressure $p^{setp}_{FW}$ at the front wheel FW is not defined by a predefined functional relationship $f^{compensation}_{ABS}$ but is instead applied. For this purpose, the instantaneous braking torque $M_{brake\ total}$ is inferred from the average/averaged brake pressure $p_{RW}$ at the rear wheel RW on the basis of a characteristic curve which is stored, for example, in the control unit ECU. Said braking torque $M_{brake\ total}$ is compared with the setpoint braking torque (corresponding braking torque without antilock regulation, line 31), which is known, and the front wheel brake pressure $p^{setp}_{FW}$ is increased until the instantaneous braking torque and the setpoint braking torque approximately correspond.

According to a further exemplary embodiment, the rear wheel brake component which is absent when antilock regulation occurs is not only compensated, but also overcompensated. For this purpose, the front wheel brake pressure $p^{setp}_{FW}$ at a given master brake cylinder pressure $p^{meas}_{MC\ RW}$ is increased even further compared to the characteristic curve 33 (functional relationship $f^{compensation}_{ABS}$). This can be described on the basis of a corresponding functional relationship $f^{overcompensation}_{ABS}$ between the pressure which is brought about at the master brake cylinder $p^{meas}_{MC\ RW}$ as a result of the activation of the footbrake lever and the brake pressure $p^{setp}_{FW}$ which is to be applied to the front wheel:

$$p^{setp}_{FW} = f^{overcompensation}_{ABS}(p^{meas}_{MC\ RW}) \quad (3)$$

Figure 4:
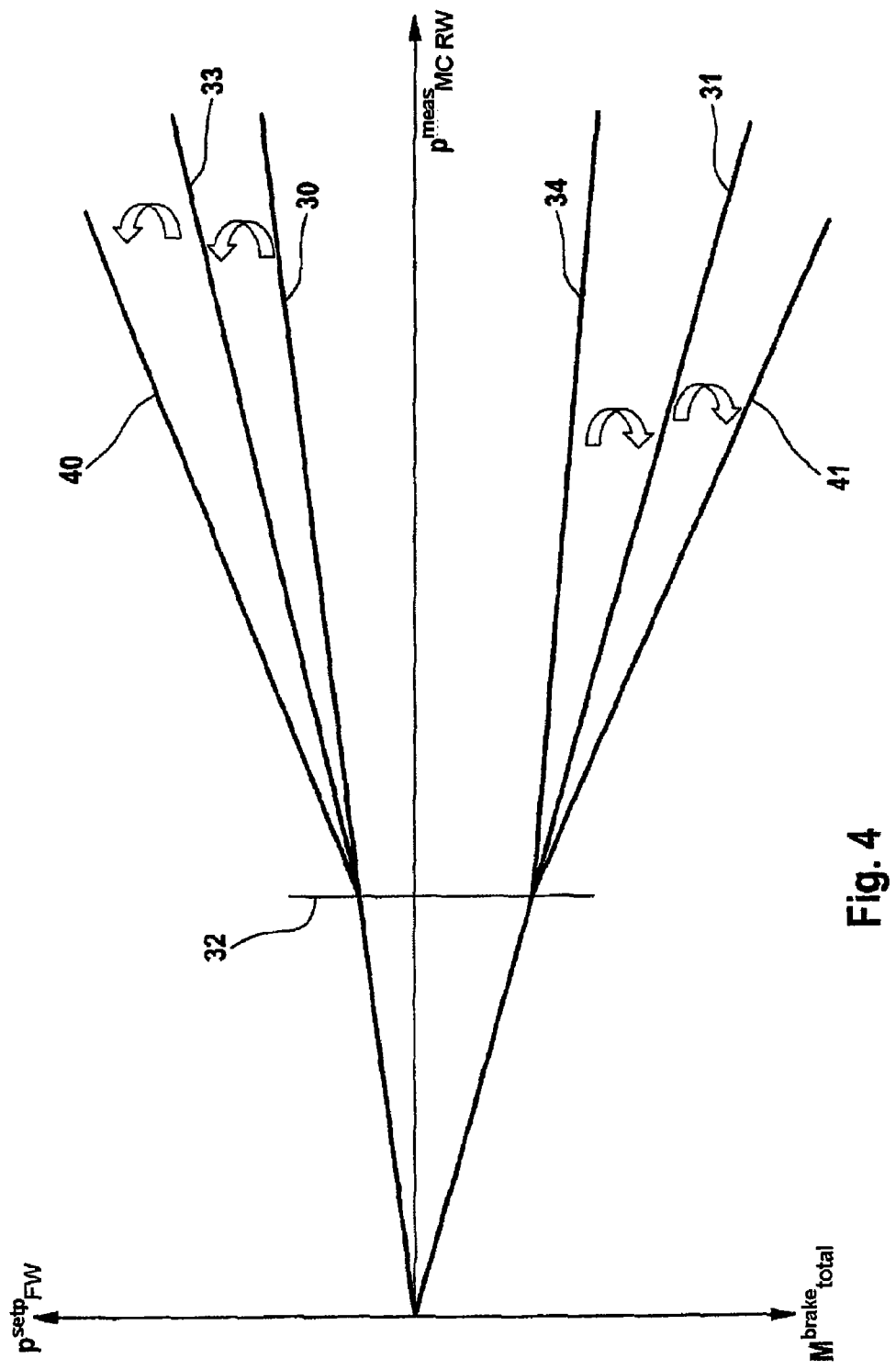
FIG. 4 shows a second exemplary change in the relationship between the pressure at the footbrake cylinder and the brake pressure at the front wheel after a deployment of antilock regulation at the rear wheel (overcompensation).

In the upper part of FIG. 4, the basic characteristic curve 30, characteristic curve 33 for compensation and an exemplary characteristic curve 40 for the purpose of overcompensation are illustrated for comparison. The characteristic curve 40 is, for example, a linear characteristic curve, i.e. a linear relationship between a rear master brake cylinder pressure $p^{meas}_{MC\ RW}$ and the front wheel brake pressure $p^{setp}_{FW}$. The gradient of the characteristic curve 33 is greater than that of the basic characteristic curve 30. The gradient of the characteristic curve 40 is even greater than that of the characteristic curve 33.

Line 41 in the lower part of FIG. 4 represents the braking torque (total braking torque of the motorcycle) which occurs when there is antilock regulation at the rear wheel RW using the characteristic curve 41. For a given rear master brake cylinder pressure $p^{meas}_{MC\ RW}$, the braking torque $M_{brake\ total}$ (line 41) which results in the case of overcompensation is greater than the braking torque $M_{brake\ total}$ (line 31) which is achieved when there is antilock regulation at the rear wheel RW in the case of compensation according to characteristic curve 33.

The overcompensation causes the front wheel FW to be subjected to antilock regulation earlier as a result of an activation of the footbrake lever 2 than would be the case when compensation occurs. This corresponds to the functionality of a braking assistant (BA) with the start of the antilock regulation 32 of the rear wheel RW as an indicator. If the driver brakes at the rear wheel RW into the antilock regulation (which initially causes a relatively unstable travel situation), it is possible to assume that he has a reason for this and it is therefore a case of emergency braking. The method according to aspects of the invention assists the driver through a type of braking assistant in that the abovementioned compensation is increased in a selected way (over-compensation) in order also to subject the front wheel FW to antilock regulation. A selected increase in the total braking torque (line 41 in FIG. 4) is therefore achieved compared to the braking effect without an antilock regulating intervention with the same position of the footbrake lever (line 31).

Whether compensation or overcompensation is to be carried out can be made dependent on the rear wheel brake pressure $p_{RW}$ at the start 32 of the antilock regulation (at the rear wheel RW). A low rear wheel pressure $p_{RW}$ (for example lower than a predefined limiting value) at the start 32 of antilock regulation corresponds to a low coefficient of friction (tire/underlying surface). Overcompensation is not absolutely necessary here. A relatively high rear wheel pressure $p_{RW}$ (for example higher than a predefined limiting value) at the start 32 of antilock regulation is an indication of relatively high (medium to high) coefficients of friction. There is potential here which can be utilized for overcompensation. It is therefore possible to base the "overcompensation yes or no?" decision on whether there actually is a sufficiently high value of the coefficient of friction for overcompensation. At low values of the coefficient of friction, overcompensation would tend to be disadvantageous since an unstable travel state would very quickly be brought about without the braking effect being appreciably increased. Low values of the coefficient of friction can be detected, for example at the start 32 of the antilock regulation, at low braking pressures.

The velocity of the vehicle can also be used for the "overcompensation yes or no?" decision. At low velocities, overcompensation is not used since there could also be tight bends or a maneuvering operation involved here and overcompensation would then be most undesirable. Relatively low velocity ranges are also less critical and it is possible to dispense with braking assistance in such a situation.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A method for regulating a brake pressure in a motorcycle having an antilock function and having an integral brake function, said method comprising:

by means of the integral brake function, front wheel braking means are activated in conjunction with activation of a brake at a rear wheel (RW) and a brake pressure ($p^{setp}_{FW}$) in a front wheel brake circuit is regulated on the basis of a first predefined dependency (f) upon a pressure ($p^{meas}_{MC\,RW}$) which is brought about at the master brake cylinder of a rear wheel brake circuit as a result of the activation of the brake, wherein, when a regulating intervention, which takes place as a result of the antilock function, occurs at the rear wheel (RW) during integral braking, a higher brake pressure ($p^{setp}_{FW}$) is applied in the front wheel brake circuit than is applied at the prevailing pressure ($p^{meas}_{MC\,RW}$) at the master brake cylinder of the rear wheel brake circuit on the basis of the first dependency (f) when an antilock regulating intervention does not occur.

2. The method according to claim 1, wherein the front wheel brake pressure ($p^{setp}_{FW}$) which is applied when an antilock regulating intervention occurs at the rear wheel (RW) is determined on the basis of a second predefined dependency ($f_{ABS}$) from the pressure ($p^{meas}_{MC\,RW}$) which is brought about at the master brake cylinder of the rear wheel brake circuit as a result of the activation of the brake.

3. The method according to claim 1, wherein the front wheel brake pressure ($p^{setp}_{FW}$) which is applied when an antilock regulating intervention occurs at the rear wheel (RW) is regulated on the basis of the achieved braking effect ($M_{brake\,total}$) of the motorcycle.

4. The method according to claim 1, wherein the front wheel brake pressure ($p^{setp}_{FW}$) which is applied when an antilock regulating intervention occurs at the rear wheel (RW) is selected to be so much higher ($f^{compensation}_{ABS}$) that the braking effect ($M_{brake\,total}$) on the motorcycle which is achieved in the case of an antilock braking intervention, for any predefined pressure ($p^{meas}_{MC\,RW}$) at the master brake cylinder of the rear wheel brake circuit is approximately the same as the braking effect which is achieved in the case of no antilock regulating intervention.

5. The method according to claim 4, wherein the front wheel brake pressure ($p^{setp}_{FW}$) is selected such that the braking effect ($M_{brake\,total}$) on the motorcycle which is achieved in the case of an antilock regulating intervention is approximately the same as the braking effect which is achieved in the case of no antilock regulating intervention when the rear wheel brake pressure ($p_{FW}$) at the start of the antilock regulation is lower than a predefined limiting value, and/or the coefficient of friction of the underlying surface is lower than a predefined limiting value and/or the velocity of the vehicle is lower than a predefined limiting value.

6. The method according to claim 1, wherein, for each predefined pressure ($p^{meas}_{MC\,RW}$) at the master brake cylinder of the rear wheel brake circuit, the front wheel brake pressure ($p^{setp}_{FW}$) which is applied when there is an antilock regulating intervention at the rear wheel (RW) is selected to be higher ($f^{overcompensation}_{ABS}$) to such an extent that the braking effect ($M_{brake\,total}$) on the motorcycle which is achieved in the case of an antilock regulating intervention is greater, by a predefined amount, than the braking effect which is achieved in the case of no antilock regulating intervention.

7. The method according to claim 6, wherein the front wheel brake pressure ($p^{setp}_{FW}$) is selected such that the braking effect ($M_{brake\,total}$) on the motorcycle which is achieved in the case of an antilock regulating intervention is greater than the braking effect which is achieved in the case of no antilock regulating intervention when the braking is emergency braking.

8. The method according to claim 6, wherein the front wheel brake pressure ($p^{setp}_{FW}$) is selected such that the braking effect ($M_{brake\,total}$) on the motorcycle which is achieved in the case of an antilock regulating intervention is greater than the braking effect which is achieved in the case of no antilock regulating intervention when the rear wheel brake pressure ($p_{FW}$) at the start of the antilock regulation is higher than a predefined limiting value and/or the coefficient of friction of the underlying surface is higher than a predefined limiting value and/or the velocity of the vehicle is higher than a predefined limiting value.

9. The method according to claim 1, wherein the front wheel brake pressure ($p^{setp}_{FW}$) which is applied when an antilock regulating intervention occurs at the rear wheel (RW) is selected as a function of a velocity of the vehicle.

* * * * *